United States Patent

[11] 3,559,726

[72] Inventor George N. Menasoff
Hastings-On-Hudson, N.Y.
[21] Appl. No. 747,250
[22] Filed July 24, 1968
[45] Patented Feb. 2, 1971
[73] Assignee Anaconda Wire and Cable Company
a corporation of Delaware

[54] TEMPERATURE MONITOR
7 Claims, 5 Drawing Figs.

[52] U.S. Cl. ................................................. 165/11, 73/355
[51] Int. Cl. ................................................. F28f 13/00
[50] Field of Search ........................................ 165/11; 73/355; 266/3; 263/3

[56] References Cited
UNITED STATES PATENTS
3,314,293  4/1967  Schraeder ................... 73/355
FOREIGN PATENTS
721,145  12/1954  Great Britain ............... 73/355

Primary Examiner—Robert A. O'Leary
Assistant Examiner—Charles Sukalo
Attorney—Victor F. Volk ABSTRACT: The temperature of an advancing wire that, because of its low emissivity, could not be measured accurately by a radiation pyrometer is measured indirectly by sensing the radiation from a high emissivity sheave which is heated by the wire conductively.

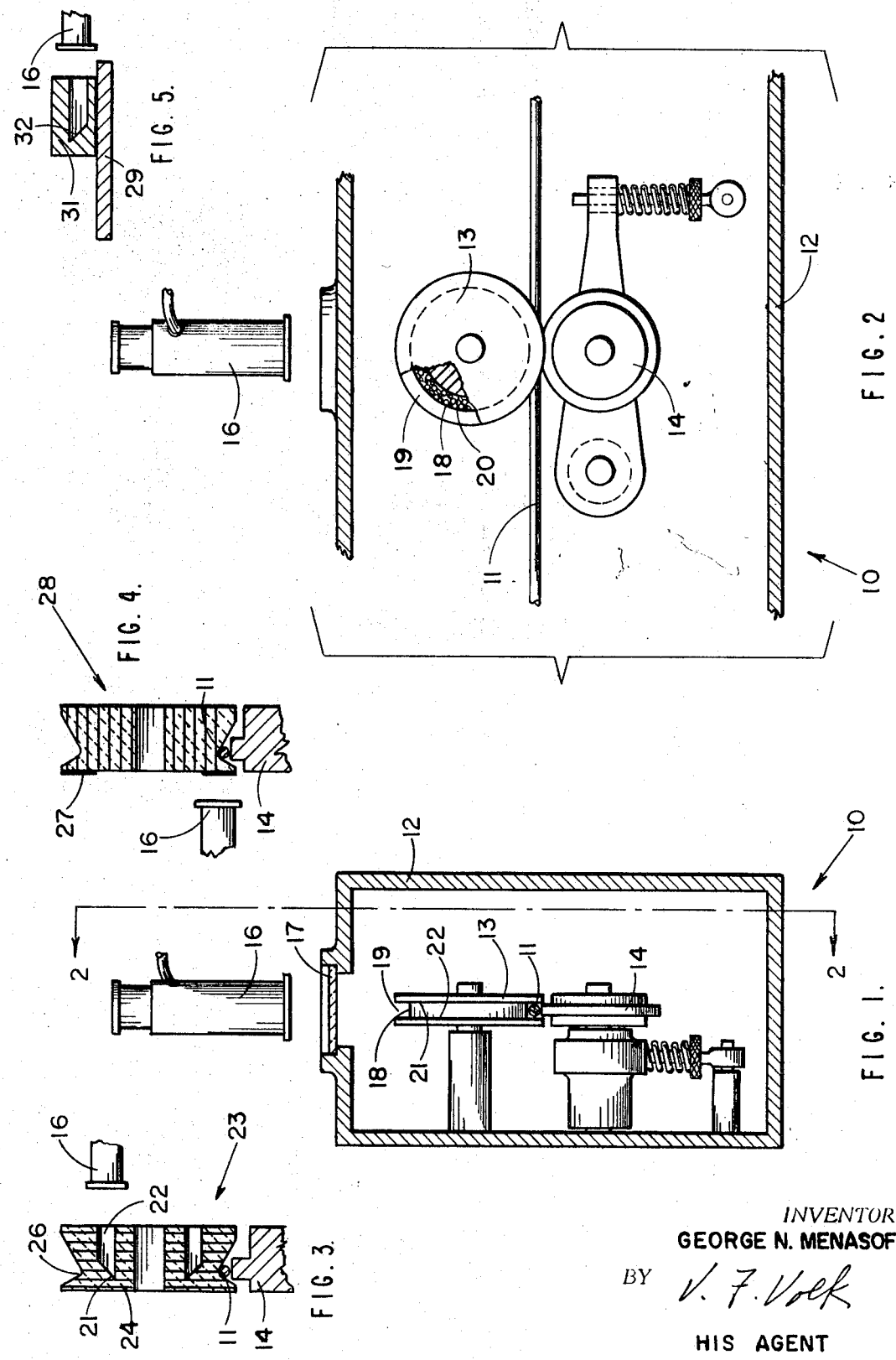

TEMPERATURE MONITOR

BACKGROUND OF THE INVENTION

In the continuous processing of metal wire and strip it is often required, as in the case of wire annealing, to keep an accurate control of the metal temperature. Radiation pyrometry would constitute a simple and convenient means of measuring and/or controlling the temperature of metal wires or strips except for the low emissivity associated with metal surfaces and the wide variation of metal surface emissivity with different degrees of oxidation. In addition to low emissivity values, moving wires have the shortcoming in regards to radiant energy monitoring that the surface area may be too small to comprise an adequate target for a pyrometer. As a result continuous wire annealers employ electrical resistance as a measure of temperature and it has been suggested to contact the wire surface with thermocouples. Since radiation pyrometers are commercially available in ranges from infrared to ultraviolet and since measurements with such instruments have the advantages that they may be made through transparent windows, at safe distances from excessive heat or corrosive atmospheres, and lend themselves readily to the application of control circuits, it would be greatly beneficial to make use of radiant energy for temperature monitoring of metals in process.

SUMMARY

I have discovered that the advantages of radiant energy pyrometers may be realized in the temperature measurement of moving articles of high reflectivity by abstracting heat from the moving article by conduction to a solid body that has an area of high emissivity and sensing radiation from this area with a pyrometer. Preferably this body will comprise a rotary member that is in rolling contact with the article, but where abrasion of the body presents no decisive problem the body may comprise a shoe that has sliding contact with the article. My invention comprises embodiments where the area of high emissivity is free from contact with the article as well as embodiments where it has contact with the article such as where the high emissivity area comprises the rolling surface of a rotary member. The heat abstracting body, in one particularly advantageous embodiment, comprises walls that define a deep narrow opening with the area of high emissivity being sensed through the opening so that it radiates substantially as a black body.

BRIEF DESCRIPTION OF THE DRAWING

FIG. 1 shows an end view of an apparatus of my invention.
FIG. 2 shows a view through the lines 2-2 of FIG. 1.
FIGS. 3, 4, and 5 show sections of different embodiments of heat abstracting blocks for the apparatus of my invention.

DESCRIPTION OF THE PREFERRED EMBODIMENTS

In my apparatus, indicated generally by the numeral 10 a copper wire 11 which normally has a low emissivity that is difficult to read accurately with a pyrometer is passing through an annealing oven 12 at an elevated temperature induced in a known manner by means not shown. A heat abstracting body in the form of a sheave 13 is positioned in the path of the wire whence contact is maintained by means of a pressure wheel 14. A sensing head 16 of a pyrometer of which many suitable types are commercially available such as the Model Py-150 improved radiation pyrometer sold by the Pyrotel Corporation of Mamaroneck, N.Y., is mounted above a window 17 in the oven 12. The head is focused to see a radiating surface 18 of the sheave 13 that has been heated to approximate the temperature of the wire 11 by conduction of sensitive heat from the wire. As shown in the drawing the wire is approaching the observer and the surface 18 "seen" by the sensing head 16 will comprise an area which has, an instant previously, been in contact with the hot wire. The surface 18 is comprised of a high emissivity material such as a ceramic or graphite but the emissivity is enhanced by having the surface 18 at the bottom of a deep, narrow opening or channel 19 so that walls 21, 22 of the channel will reflect back any stray reflections from the surface 18 in the well known "black body" effect. In the embodiment of FIGS. 1 and 2 where radiation is being sensed from an area immediately after it has been in contact with the hot article whose temperature is being measured heat transfer within the body 13 beyond the surface is of no value and indeed were better avoided as by providing an insulation layer 20 directly under the surface 18 (FIG. 2) where the layer 18 is comprised of a dense ceramic capable of resisting the abrasion of the wire 11, for example, the layer 20, may advantageously comprise a highly porous ceramic with good heat insulating properties.

In some cases, depending largely on the nature of the wire 11, deposits from the wire will effect the emissivity of the surface 18. This possibility is avoided by the embodiment of FIG. 3 wherein the area of high emissivity does not come in contact with the wire. Here the area is a sloping surface 21 deep within an opening 22 providing black body effect in a sheave 23. The entire sheave 23 may be fabricated from graphite if it is to be used in a reducing atmosphere and it may advantageously be fabricated from an anistropic graphite such as the product sold under the trademark Pyroid by the Pyrogenics Division of Space Age Materials Corp. of Woodside, N.Y. This material has very good heat conductivity along one planar direction and good heat resistance normal to it. Thus with radial laminations 24 as shown, heat will be conducted to the surface 21 from a groove 26 in the sheave 23. If, however, the laminations are made circumferential (FIG. 4) the pyrometer may be directed to an area 27 on the flat surface of a graphite sheave 23 in which the high emissivity of .94 of graphite is utilized without the black body effect. In FIG. 5 I have shown an embodiment for sensing the temperature of an advancing strip 29 wherein a block 31 is in sliding contact with the strip 29 and the pyrometer 16 receives radiation from an area 32 of high emissivity.

I have invented a new and useful apparatus for temperature monitoring of which the foregoing description has been exemplary rather than definitive and for which I desire an award of Letters Patent as defined in the following claims.

I claim:

1. Apparatus monitoring the temperature of an advancing elongated article of low emissivity comprising:
   A. a solid heat abstracting body mounted at a station in the path of advancing of said article;
   B. means continuously urging said article and said body into surface contact whereby heat is transferred by conduction from said article to said body;
   C. an area of high emissivity of said body; and
   D. pyrometric means sensing radiation from said area.
2. The apparatus of claim 1 wherein said body comprises a rotary member in rolling contact with said article.
3. The apparatus of claim 1 wherein said body comprises a shoe in sliding contact with said article.
4. The apparatus of claim 2 wherein said area is free from contact with said article.
5. The apparatus of claim 2 wherein said area comprises the surface of said rotary member having contact with said article.
6. The apparatus of claim 1 wherein said heat abstracting body comprises walls defining a deep, narrow opening, said area being sensed through said opening thereby radiating substantially as a black body.
7. The apparatus of claim 3 wherein said area is free from contact with said article.